United States Patent
Chu et al.

(10) Patent No.: US 11,797,842 B2
(45) Date of Patent: Oct. 24, 2023

(54) IDENTIFYING FRICTION POINTS IN CUSTOMER DATA

(71) Applicant: International Business Machines Corporation, Armonk, NY (US)

(72) Inventors: Linsong Chu, White Plains, NY (US); Pranita Sharad Dewan, White Plains, NY (US); Raghu Kiran Ganti, Elmsford, NY (US); Joshua M. Rosenkranz, Westchester, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 16/530,020

(22) Filed: Aug. 2, 2019

(65) Prior Publication Data

US 2021/0034963 A1  Feb. 4, 2021

(51) Int. Cl.
*G06N 3/08* (2023.01)
*G06F 16/28* (2019.01)
*G06F 16/2458* (2019.01)

(52) U.S. Cl.
CPC .......... *G06N 3/08* (2013.01); *G06F 16/2465* (2019.01); *G06F 16/285* (2019.01); *G06F 2216/03* (2013.01)

(58) Field of Classification Search
CPC ...... A01H 5/08; A01H 6/368; G06F 16/2465; G06F 16/285; G06F 2216/03; G06N 3/0445; G06N 3/08; G06N 3/082
See application file for complete search history.

(56) References Cited

U.S. PATENT DOCUMENTS

| | | | |
|---|---|---|---|
| 7,970,216 B2 * | 6/2011 | Bashyam | H04N 19/17 |
| | | | 382/233 |
| 9,002,855 B2 | 4/2015 | Brooks et al. | |
| 9,092,801 B2 | 7/2015 | Chang et al. | |
| 9,674,362 B2 | 6/2017 | Piaggio et al. | |
| 2013/0282430 A1 | 10/2013 | Kannan et al. | |

(Continued)

FOREIGN PATENT DOCUMENTS

| | | | |
|---|---|---|---|
| CN | 109033303 A | * 12/2018 | G06F 40/30 |
| KR | 20190023389 A | * 8/2017 | G06K 9/20 |
| WO | 2017064319 A1 | 4/2017 | |

OTHER PUBLICATIONS

Nowozin, S. et al., "Discriminative Subsequence Mining for Action Classification", International Conference on Computer Vision, IEEE Computer Society (2007). (Year: 2007).*

(Continued)

*Primary Examiner* — Pan G Choy
(74) *Attorney, Agent, or Firm* — Jared C. Chaney

(57) ABSTRACT

Aspects of the present disclosure relate to identifying friction points in customer data. In some embodiments, identifying friction points can include receiving a set of input sequence data and predicted class labels for the set of input sequence data; selecting input sequences, from the set of input sequence data, that have class labels matching a ground truth class label; reducing the selected sequences to anchor points; and grouping the reduced selected sequences into critical data set signatures using discriminatory subsequence mining.

20 Claims, 8 Drawing Sheets

(56) References Cited

U.S. PATENT DOCUMENTS

| | | | |
|---|---|---|---|
| 2014/0336573 A1* | 11/2014 | Yu | A61M 25/0136 604/95.04 |
| 2016/0036930 A1 | 2/2016 | Green et al. | |
| 2016/0078456 A1 | 3/2016 | Chakraborty et al. | |
| 2016/0103954 A1* | 4/2016 | Conway | G16B 20/20 702/19 |
| 2017/0186018 A1 | 6/2017 | Nandi et al. | |
| 2017/0212829 A1* | 7/2017 | Bales | G06F 11/3604 |
| 2018/0025291 A1* | 1/2018 | Dey | G06N 7/01 706/11 |
| 2018/0060727 A1 | 3/2018 | Rainwater | |
| 2018/0063265 A1 | 3/2018 | Crossley et al. | |
| 2018/0130068 A1* | 5/2018 | Sampath | H04M 3/5166 |
| 2018/0276692 A1 | 9/2018 | Sequeira et al. | |
| 2019/0034947 A1* | 1/2019 | Rucker | G06Q 30/0281 |
| 2019/0129947 A1 | 5/2019 | Shin | |
| 2019/0251445 A1* | 8/2019 | Movshovitz-Attias | G06N 3/084 |
| 2020/0167690 A1 | 5/2020 | Zhao | |

OTHER PUBLICATIONS

Ji X., Bailey, J., & Dong, G. (2007). "Mining Minimal Distinguishing Subsequence Patterns with Gap Constraints", Knowledge and Information Systems, 11 (3), 259-286. Wright State University—Main Campus, The Ohio Center of Excellence in Knowledge-enabled computing (Apr. 2007). (Year: 2007).*

"Discriminative Subsequence Mining for Action Classification", International Conference on Computer Vision, IEEE Computer Society (2007). (Year: 2007).*

Harbich et al., "Discovering Customer Journey Maps using a Mixture of Markov Models," University of Lausanne, Faculty of Business and Economics (HEC), Switzerland, Printed Apr. 25, 2019, 5 pages.

Yin et al., "Mining Effective Subsequences with Application in Marketing Attribution," 2016 IEEE 16th International Conference on Data Mining Workshops, DOI 10.1109, 2016, 8 pages.

Terragni et al., "Analyzing Customer Journey with Process Mining: from Discovery to Recommendations," 2018 IEEE 6th International Conference on Future Internet of Things and Cloud, DOI 10.1109, 2018, 6 pages.

Richardson, "Using Customer Journey Maps to Improve Customer Experience," Printed Apr. 25, 2019, 5 pages, https://hbr.org/2010/11/using-customer-journey-maps-to.

Deng et al., "The Prediction of User Topic Interest Based on Tags and Interaction of Users," 2016 IEEE First International Conference on Data Science in Cyberspace, DOI 10.1109, 2016, 7 pages.

Anonymous, "Method and System for Automatically Tracking User Interactions and Providing Tags to the User Interactions," An IP.com Prior Art Database Technical Disclosure, IP.com No. IPCOM000202121D, IP.com Electronic Publication Date: Dec. 4, 2010, 3 pages.

Mell et al., "The NIST Definition of Cloud Computing," Recommendations of the National Institute of Standards and Technology, U.S. Department of Commerce, Special Publication 800-145, Sep. 2011, 7 pages.

Chu et al., "Annotating Customer Data," U.S. Appl. No. 16/530,046, filed Aug. 2, 2019.

List of IBM Patents or Patent Applications Treated as Related, Dated Jul. 31, 2019, 2 pages.

* cited by examiner

IDENTIFYING FRICTION POINTS IN CUSTOMER DATA

STATEMENT REGARDING FEDERALLY SPONSORED RESEARCH OR DEVELOPMENT

This invention was made with Government support under W911NF-16-3-0001 awarded by Army Research Office. The Government has certain rights to this invention.

BACKGROUND

Aspects of the present disclosure relate to tagging and identifying customer data, more particular aspects relate to determining useful tags for customer data sets and identifying friction points in customer data.

BRIEF SUMMARY

The present disclosure provides a method, computer program product, and system of identifying friction points in customer data. In some embodiments, the method includes receiving a set of input sequence data and predicted class labels for the set of input sequence data, selecting input sequences, from the set of input sequence data, that have class labels matching a ground truth class label, reducing the selected sequences to anchor points, and grouping the reduced selected sequences into critical data set signatures using discriminatory subsequence mining.

In some embodiments, the computer program product includes a computer readable storage medium having program instructions embodied therewith, the program instructions executable by a computer to cause the computer to receive a set of input sequence data and predicted class labels for the set of input sequence data, select input sequences, from the set of input sequence data, that have class labels matching a ground truth class label, reduce the selected sequences to anchor points, and group the reduced selected sequences into critical data set signatures using discriminatory subsequence mining.

In some embodiments, the system includes a processor, and a memory in communication with the processor, the memory containing program instructions that, when executed by the processor, are configured to cause the processor to perform a method, the method comprising: receiving a set of input sequence data and predicted class labels for the set of input sequence data, selecting input sequences, from the set of input sequence data, that have class labels matching a ground truth class label, reducing the selected sequences to anchor points, and grouping the reduced selected sequences into critical data set signatures using discriminatory subsequence mining.

DETAILED DESCRIPTION

Figure 1:
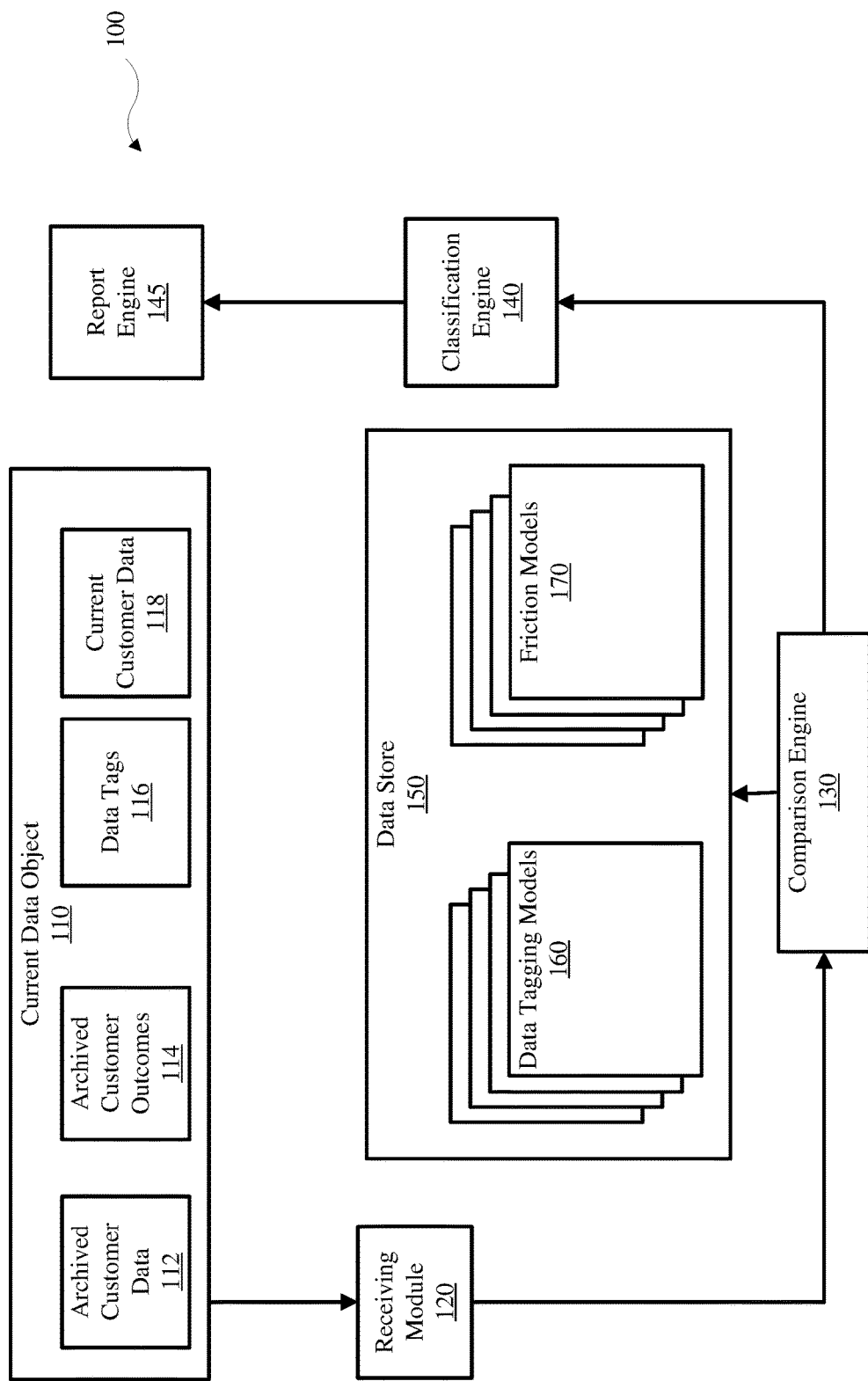
FIG. 1 is an example block diagram illustrating components of a data annotation system according to various embodiments of the present invention.

Aspects of the present disclosure relate to computer-implemented environments, more particular aspects relate to automatically controlling computer-implemented environments. While the present disclosure is not necessarily limited to such applications, various aspects of the disclosure may be appreciated through a discussion of various examples using this context.

The advancement of computing storage and computational power provide the ability to collect large amounts of data, particularly for various types of data relating to various types of entities such as, for example, businesses, organizations, or governments. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within a business environment.

A customer data can often be broken down into touch points recorded when customers interact with an organization, from initial contact, through purchasing, after sales support, and hopefully on to repurchase and advocacy. As used herein, the term "customer data" (customer data may also be referred to as a customer journey) may be data recorded through the interactions of a user/customer with respect to performing a particular task (e.g., shopping, researching, purchasing, comparing, etc.). In some embodiments, "customer data" may also include data recorded from a sequence of interactions associated with a specific individual, entity, or decision-making unit (e.g., members of the same family, employee of the same company, etc.). In some embodiments, "customer data" may also include data reflecting one or more steps or sequences that customers experience, perform, or consider while engaging with a selected entity (e.g., purchasing or reviewing a product in an online experience, retail experience, or a service experience).

Various industries track customer data, for example, through websites or point-of-contacts (e.g., tracking customer clicks, customer calls, etc.). Recorded customer data is used for more efficient distribution of computer resources, streamlining customer interfaces, and improving the likelihood of a chosen outcome. For example, some entities may track customer interaction with the entity's call-center and/or website and then use this information, for example, to predict churn or adding upgrading a line.

The goal of a customer journey is to understand how customers behave across multiple interactions, regardless of the exact method or channel of interaction, so that an entity can deliver a consistent exceptional experience. However, as channels and types of interactions increase, there is a resulting explosion in the number of different journeys a customer can take, and therefore a need to understand the intent, motivations, and actions of the customers along with understanding the questions and barriers faced by a customer during their engagement with an entity.

Some computer-implemented environments collect data from a user across multiple data points (e.g., web clicks, mobile app, in-store visits, call center, or chat), but it is not currently possible to tag each data point. Traditional systems may allow for manual tagging of sequences but are not able to label subsequences (smaller data points). Furthermore, even tagging all sequences is not practical with millions of users and user data. Some systems receive tens of millions of data points for customers each day, and therefore identifying the friction points (e.g., points where the customer interaction was stopped or lagged) is difficult. For example, a friction point may be a place where a customer paused or stopped a purchase of a phone. In an example, a customer wants to purchase a silver phone, but an image shows a black phone and the customer stops the purchase process. Multi-channel customer interaction data (e.g., mobile app, desktop web app, in-store visits, call center, etc.) create 100s of GB/month of data currently and will likely increase. Processing this data is currently a challenging process. Noisy data (e.g., data with a large amount of additional meaningless information in it) from millions of unique user data sets leads to missing of important patterns for coarse-grained analysis (e.g., binary flag/counts on interaction types) and obscuring of the data signals at finer-grain analysis. Combining this with the various permutations of events leads to learning algorithms that must analyze excessively large data volumes.

Currently, determining friction points involves a user coming up with a hypothesis for what a friction point may be and sorting through the data to determine if the data supports the hypothesis. This rule based processing produces limited data and error-prone learning of patterns through provided data tags and guessed friction points. Rule based processing costs significant computer resources without producing accurate results. Added to that, data points and workflows are constantly changing with evolving technologies and design. Therefore, discovering new friction points is a major technological hurdle. In some embodiments of the present disclosure, friction points are found by identifying commonalities in the data across user examples.

In some embodiments, the system determines workflow or data processing differences between devices that may cause differentiating friction points. For example, a webpage displayed on a smart phone may show a purchase button, but the same webpage displayed on a smart watch may not display the purchase button because a difference in the data processing between the smart watch and the smart phone. In some embodiments, a system takes into account unique factors and determines how they affect labels or friction points. For example, a tag or label for a datapoint may include one or more of device type, geographic location, language, age, technological proficiency of the user, education level, and/or socio economic status.

In some embodiments, the system recommends an annotation for a point in customer data. In some embodiments, a point of customer data may be considered a sequence or a sub-sequence. For example, a sequence may be data associated with a customer interaction with a web page, data associated with a customer purchasing a phone online, data associated with a customer visit to a store, data associated with a customer call, data associated with a customer using an application, etc. For example, a sub-sequence may be data associated with a customer clicking a button on a web page, data associated with a customer entering information on a web page, data associated with a customer interaction in a store, data associated with a customer giving information on the phone, data associated with a customer asking a question on a phone, etc. In some embodiments, the systems summarize data in each touchpoint into a k-hot encoding feature vector (top k terms from the touchpoint text with weights determined by term frequency-inverse document frequency (tf-idf), perplexity scores, etc.). In some embodiments, tf-idf is a numerical statistic that is intended to reflect how important a word is to a document in a collection or corpus. In some embodiments, a tf-idf ranking is based on the distance between two probability distributions, which is expressed as the cross-entropy. One probability distribution is the global distribution of query words in the collection and the other probability distribution is a distribution of query words in textual data, such as textual data in the customer data. The tf-idf ranking is a measure of perplexity between these two distributions. In some embodiments, perplexity is a measurement of how well a probability distribution or probability model predicts a sample. It may be used to compare probability models. A low perplexity indicates the probability distribution is good at predicting the sample. Furthermore, a larger perplexity score implies higher potential relevance of the document.

FIG. 1 is a block diagram illustrating components of a data annotation system 100 according to one illustrative embodiment. The data annotation system 100 includes a current data object 110 with archived customer data 112, archived customer outcomes 114, data tags 116, and current customer data 118, a receiving module 120, a comparison engine 130, a classification engine 140, a data store 150 with a multiple of data tagging models 160 and friction models 170, and a reporting engine 145. In some embodiments, data annotation system 100 may run on cloud computing environment 50 of FIG. 6.

In some embodiments, the receiving module 120 may receive data in current data object 110. In some embodiments, archived customer data 112, archived customer outcomes 114, and data tags 116 are received from a database or server. In some embodiments, archived customer outcomes 114 are a collection of historical data collected for a user or a group of users over a set time period and may be linked to archived customer data 112 for the same user or group of users over the same time period. For example, the data may be collected for a group of users in a geographical area (e.g., a town, a county, a state, or a country) for a one month period.

In some embodiments, data tags 116 are historical data tags. For example, data tags may be data tags that have previously been created for specific data of archived customer data 112 by a user and/or verified to be accurate for archived customer data 112. For example, examples of data tags (such as color choice, data selection, etc.) and related archived customer data from historical examples may be used. In some embodiments, data, such as archived customer data 112 and current customer data 118, is collected across multiple touch points (e.g., web clicks, mobile app, in-store visits, call center, chat).

In some embodiments, comparison engine 130 compares archived customer data 112 and archived customer outcomes 114 to data tags 116. In some embodiments, the comparison is used to create correlation coefficients between archived customer data 112 and data tags 116. For example, if a customer ultimately does not upgrade their service plan, system 100 may tag a data point with a first tag of "did not upgrade." Then, system 100 may extract a term such as "data level" from the data point and associate the term "data level" with the data point. In some embodiments, extracted terms may be actual text in the data or terms previously associated with similar data points. In some embodiments, the comparison is used to create correlation coefficients between archived customer data 112 and data tags 116. In some embodiments, comparison engine 130 creates data tagging models, such as data tagging models 160, from the comparison of archived customer data 112 to archived customer outcomes 114 and stores the models in data store 150. In some embodiments, the data annotation system 100 uses the data tagging models 160 to train a first neural network to predict data tags. In some embodiments, classification engine 140 classifies a data point with one or more tags.

In some embodiments, comparison engine 130 compares archived customer data 112 and archived customer outcomes 114 to data tags 116. In some embodiments, comparison engine 130 creates friction models, such as friction models 170, from the comparison and stores the friction models 170 in data store 150. In some embodiments, the data annotation system 100 uses the friction models 170 to train a neural network to predict a friction point in a data set. In some embodiments, classification engine 140 performs the prediction of the friction point.

In some embodiments, report engine 145 generates a report detailing the prediction of a friction point. In some embodiments, the report engine 145 graphically displays a predicted friction point.

In some embodiments, archived customer data 112 may include friction data, or data resulting in a pause, interruption, or stop of a user's interaction. For example, friction point data may be created in a situation where a customer is buying a phone and selects a gold colored body on a first webpage but on a second page a photo displays a black phone. If the customer stops on the second page, the second page or the photo of the black phone may be tagged as a friction point. In some embodiments, friction data may be a cumulation historical frictions or problems that lead to an extended customer interaction or a cutoff of customer data (customer stops the interaction). Current data object 110 may include historical data that corresponds to a variety of related and unrelated data. Accordingly, the data annotation system 100 may use the current data object 110 to select which sets of data are predictive of certain events (e.g., buying a phone, looking at but not buying a phone, increasing a data plan, decreasing a data plan, looking at but not increasing a data plan, adding a line, looking at but not adding a line). Data elements that are not predictive of such events may be discarded and/or not collected in the future.

In some embodiments, comparison engine 130 compares archived customer data 112 to archived customer outcomes 114. In some embodiments, the comparison is used to create correlation coefficients between archived customer data 112 and archived customer outcomes 114. In some embodiments, the comparison is used to create correlation coefficients between archived customer data 112 and data tags 116. In some embodiments, comparison engine 130 creates friction models, such as friction models 170, from the comparison of archived customer data 112 to archived customer outcomes 114 and stores the models in data store 150. For example, system 100 may determine that a datapoint (e.g., picture of a phone, webpage button, particular phrasing of a question, etc.) is a friction point leading to a negative outcome (e.g., not making a purchase). In some embodiments, the data annotation system 100 uses the friction models 170 to train a neural network to predict friction points in data (such as current customer data 118).

In some embodiments, classification engine 140 classifies one or more data points by a likelihood of being a friction point. For example, classification engine 140 may determine that the majority of times that when users purchasing a cell phone are shown a photo of a phone that differs from their phone color selection, the user does not continue with the purchase.

In some embodiments, comparison engine 130 creates friction models, such as friction models 170, from the comparison and stores the friction models 170 in data store 150. In some embodiments, classification engine 140 performs the prediction of a friction point.

In some embodiments, report engine 145 generates a report detailing the prediction of a friction point. In some embodiments, the report engine 145 graphically displays a predicted friction point on a diagram.

As new data objects are discovered or analyzed, those data objects and their corresponding features may be added to data store 150, thus more models may be added to a data tagging models 160 and friction models 170. In some embodiments, data store 150 includes data objects not relevant to tagging and or friction points. In some embodiments, data store 150 may have a list of one or more data points that are not friction points, may not conceivably be friction points, or are necessary and can therefore not be considered data points. For example, entering basic information such as name or address is required and may not be considered a friction point.

Figure 2:
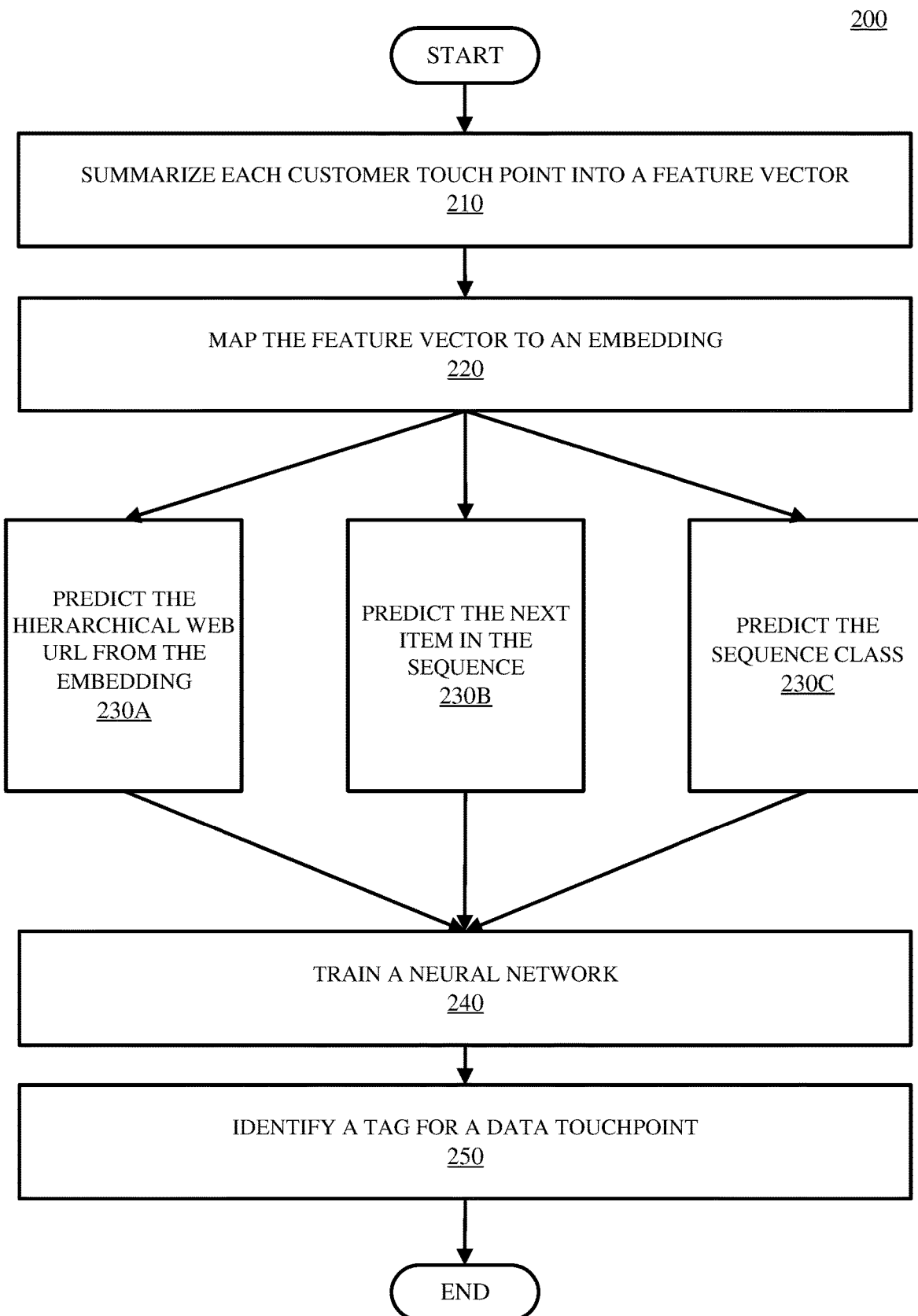
FIG. 2 illustrates an example method for annotating customer data with tags according to various embodiments of the present invention.

FIG. 2 shows an example method 200 for annotating customer data with tags. The example method 200 depicted trains a model to predict tags or annotations for particular datapoints.

In block 210 the data resulting from a customer touch point is summarized into a feature vector (e.g., using tf-idt, weight perplexity, etc.) using a k-hot embedding in the feature vector with the term's weight.

In some embodiments, k-hot embedding is a method of turning positive integers (indexes) into dense vectors of a fixed size based on a weighted scale such as term frequency or complexity. For example, a k-hot embedding system with a dictionary of 1000 words or terms may be represented by 1000 vectors. The vectors of each embedding get updated while training the neural network. This allows the visualization of not only relationships between words, but also between everything that can be turned into a vector through an embedding layer.

In one or more embodiments of the invention, the block 210 produces a lower dimensional vector for documents that preserves the contextuality of the documents. Multiple documents (D1 . . . Dn) are used as inputs to create a word embedding for every word in each of the multiple documents (D1 . . . Dn). In one or more embodiments of the invention, pre-processing of the documents can occur to remove "stop" words before or after word embedding occurs. Example stop words include words like "the," "a," "and," and "or." Also, "word embedding" refers to the process of producing an n-dimension vector for each word of a document and/or collection of information and associating each word with its corresponding n-dimension vector. An n-dimension vector $\{v1, v2, v3, v4 \ldots, vn\}$ can be considered to be a vector with an "n" number of values. Each vector can include a series of real numbers. The vector of a word can be an encoded representation of the word's meaning.

The meaning of a specific word (as represented by the word's vector) can be based at least on one or more other words that neighbor the specific word within the document/ collection. Specifically, the words that neighbor the specific word can provide context to the specific word, and the neighboring words constitute a neighborhood of the specific word. The n-dimension vector of the specific word can be an aggregation of contributions from neighboring words towards the meaning of the specific word.

The n-dimension vector of each word can provide insights into the meaning of the specific word, especially when the vector is represented as a point in n-dimensional space. The relative positioning of each word's vector representation, within the n-dimension space, reflects the relationships that exist between the words. For example, if two words have similar meanings, then the vector representations of the two words appear relatively close to each other, or the vector representations of the two words point in a similar directionality, when positioned in the n-dimensional space.

For example, if the vector representation of the word "PHONE" and the vector representation of the word "Mobile" are both positioned in n-dimension space, the vector representations appear relatively close to each other, or the vector representations point in a similar direction, because a logical relationship exists between the word "PHONE" and the word "Mobile." If the vector representations of the two words appear in close proximity to each other in the n-dimensional space (or point in a similar directionality in the n-dimensional space), then a logical relationship between these two words can be inferred.

In order to produce a vector representation of a word, embodiments of the invention can use one or more word-embedding model-producing programs. For example, embodiments of the disclosure can use natural language processing to process natural language data and can use one or more neural networks to perform word embedding. In some embodiments, the system uses natural language processing to encode the touchpoints into feature vectors. In order to produce a vector representation of a specific word within a document/collection, the neighborhood of the specific word is inputted into the one or more model-producing programs. For example, the sentences of the document/collection can be inputted into the model-producing program to produce a vector representation of the specific word that is based at least upon the inputs.

In one or more embodiments of the invention, the multiple documents (D1 . . . Dn) can be used to calculate the probability that a particular word appears in a document. In one or more embodiments of the invention, the probability is determined by identifying the number of times a particular word appears in a document and dividing that number by the total number of words in the document to obtain a probability. The numerical value of the probability can be, for example, between 0 and 1.

In block 220, the feature vectors are mapped to an embedding layer (using a fully connected layer). In some embodiments, the vectors are mapped into one or more embedding layers. An embedding is a mapping of a discrete—categorical—variable to a vector of continuous numbers.

In block 230A, using the embedding, a hierarchical web URL is predicted from this embedding in the form of a multi-layer perceptron. For example, for a user interacting with webpage "HTTPS://domainname," a web URL of "HTTPS://domainname/a/b/c" may be predicted based on the embedding. In some embodiments, when predicted at the same time, mistakes earlier in the prediction path has a higher penalty than later mistakes. For example, in a prediction occurring before data point "a" is received, a misprediction of point "a" has a higher penalty than a correct prediction of "a" and "b" and misprediction of "c."

In block 230B, the next item in the sequence, or progression from one webpage to another, is predicted using last k item embeddings using a sequence prediction model (e.g., Long short-term memory (LSTM)). For example, a user may be predicted to move from "HTTPS://domainname/a" to "HTTPS://domainname/a/b" and then "HTTPS://domainname/a/b/c," in that order. In some embodiments, mispredictions early when less data is available may have lesser penalty than mispredictions later when more data is available. For example, a misprediction of data point "c" before data point "a" has been received may have a lower penalty that a misprediction of data point "c" after data point "a" has been received.

In some embodiments, an LSTM is an artificial recurrent neural network architecture and has feedback connections that make it a "general purpose computer" (that is, it can compute anything that a Turing machine can). It cannot only process single data points (such as images), but also entire sequences of data (such as speech or video). For example, LSTM is applicable to tasks such as unsegmented, connected handwriting recognition or speech recognition.

In some embodiments, a Gated Recurrent Unit (GRU) is like a LSTM with a forget gate but has fewer parameters than LSTM, as it lacks an output gate. GRU's performance on certain tasks of polyphonic music modeling and speech signal modeling was found to be similar to that of LSTM. GRUs have been shown to exhibit even better performance on certain smaller datasets.

In block 230C the sequence class is predicted using last k item embeddings with a sequence prediction model (e.g., LSTM, GRU). Misprediction of a label using early portions of the sequence has a lesser penalty than misprediction of a label using latter portions of the sequence. For example, early in the customer journey when there is relatively little data, the penalty is relatively low, but as more data is received the penalty in the neural network increases commensurately.

In some embodiments, the sequence class is based on the ultimate disposition of the customer data. For example, ultimate dispositions may include upgrade the phone YES/NO, add a new line YES/NO, buy a new phone YES/NO, add an international calling plan YES/NO, etc.

In some embodiments, each of blocks 230A, 230B, and 230C are used in method 200. In some embodiments, one of blocks 230A, 230B, and 230C are used in method 200. In some embodiments, two of blocks 230A, 230B, and 230C are used in method 200.

In block 240, the neural network is trained using a loss function sensitive to the hierarchy of misprediction described in 230A, 230B, and 230C.

In block 250 after the neural network is trained, the mapping between the terms and the embeddings are used to extract the most influential vectors and respective terms (e.g., using standard gradient analysis)—this results in identification of terms that influenced the embedding—these terms are then recommended as the tag for a touchpoint in the customer data.

Figure 3:
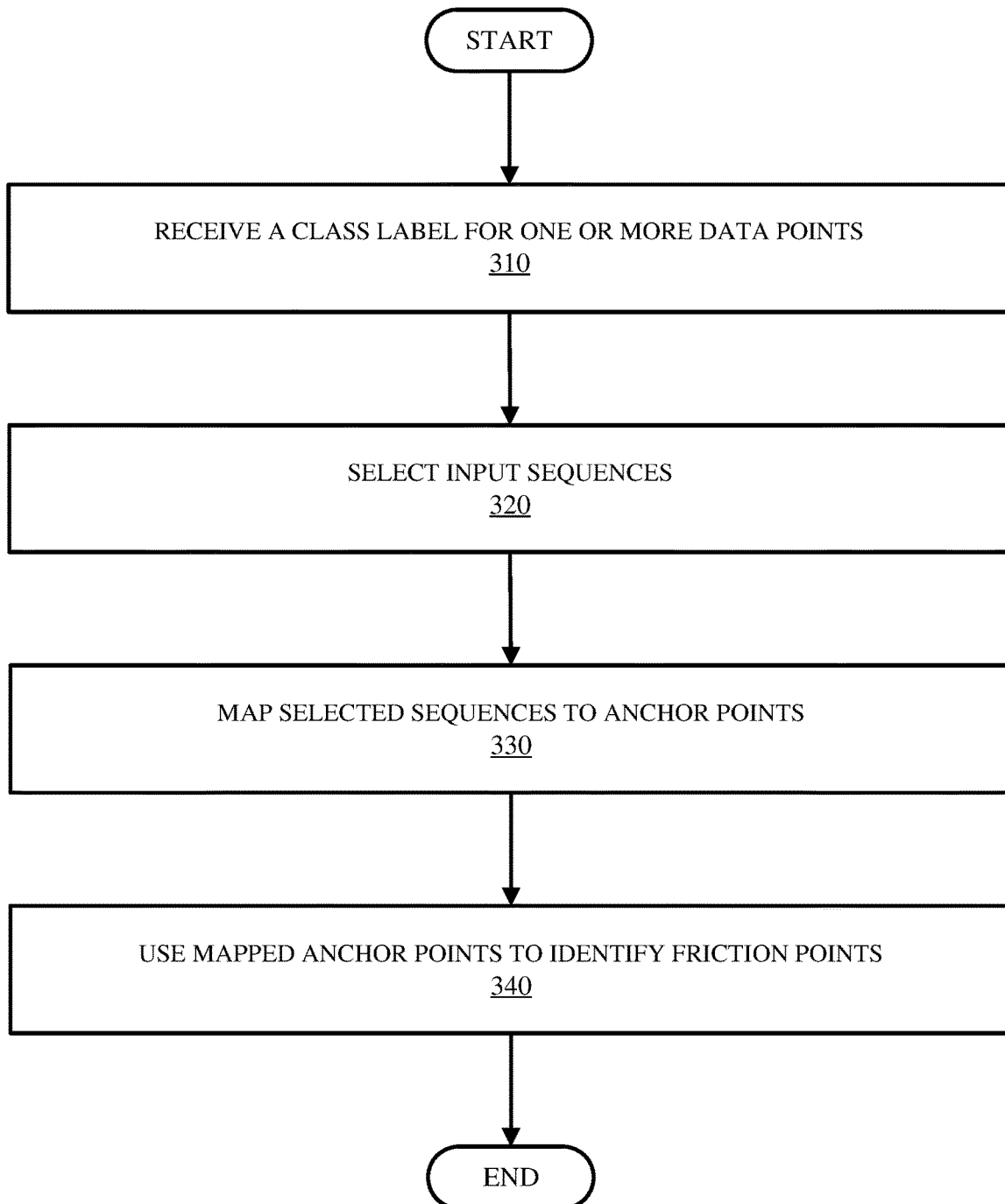
FIG. 3 illustrates an example method for identifying friction points in customer data according to various embodiments of the present invention.

FIG. 3 shows an example method 300 for identifying friction points in customer data. The example method depicted trains a model to predict friction points from a given set of customer data.

In block 310, a class label is received for one or more data points (e.g., an input sequence from a user). In some embodiments, a class label is received from a user. In some embodiments, a data point is prelabeled with a class label. In some embodiments, the labels are predicted from an attention-based sequence prediction model, such as a model produced in method 200.

In block 320, input sequences, for which the output of the model from block 310 matches a ground truth class label, are selected. In some embodiments, the ground truth class label is assured data provided by observation. For example, ground truth may be the ultimate and known disposition of a user data set such as, if the user purchased a phone, upgraded a data line, or added a new phone plan. In some embodiments, the sequence includes a collection of labeled sequences of the form $s=<x_1, x_2, \ldots, x_n>$, where x denotes a subsequence. An attention-based model identifies the most significant anchor points $x_{j1}, \ldots, x_{jm}$ that are responsible for the predicted label (such that $j_1 < j_2 < \ldots < j_m$). In some embodiments, every subsequence present in sequence "s" does not need to be an anchor and the anchor points do not need to be consecutive subsequences in sequence "s". For example, in sequence s, subsequences $x_1$, $x_5$, $x_{10}$, and $x_{20}$, may correlate to anchors $x_{j1}$, $x_{j3}$, and $x_{j4}$.

In block 330, sequences selected in block 320 are mapped to a sequence of anchor points (anchor sequence). In some embodiments, anchor points are determined from the labels from block 310. In some embodiments, anchor points are critical data points that lead to disparate outcomes. In some embodiments, these anchor sequences are discriminatory by virtue of being able to explain the class label. In some embodiments, the selected sequences will be reduced to the mapped anchor points.

In block 340, the anchor sequences from block 330 is used to identify friction points. The friction points are learned by a neural network by comparing the most frequent subsequences (e.g., using prefix-projected sequential pattern mining) to the anchor sequences from block 330. The friction points are compact and discriminatory by virtue of applying frequent subsequences over the discriminating anchor sequences. In some embodiments, the system will group the reduced selected sequences into critical data set signatures using discriminatory subsequence mining.

Given a subsequence of data, an outcome can be predicted using discriminatory subsequence mining. Frequent subsequence mining is used to identify the most significant subsequences in the journey or anchor data points. These anchors that are most important for determining the outcome. The selected anchors can be used to reduce each data set from the overall data set for each customer into compact data sets. For example, where each of 10 million data sets has approximately 1000 data points, once anchor points are determined the data sets can each be reduced down to 5-10 identified anchor points. Once the data sets are reduced the anchor points (critical data points) the reduced data sets can be grouped into critical data set signatures or friction points. Following the previous example, once each data set is reduced down to only the identified anchor points, the 10 million data sets can be reduced to 100 critical data set signatures or friction points.

In some embodiments, PrefixSpan (prefix-projected sequential pattern mining) algorithm for sequential data mining extracts the sequential patterns through a pattern growth method. The PrefixSpan algorithm is run on different datasets and results are drawn based on minimum support value. One new parameter maximum prefix length is also considered while running the algorithm. Through a maximum prefix length parameter the length of a prefix pattern is set, which is helpful for running the algorithm on large datasets. For example, an example PrefixSpan algorithm may mine sequential patterns through following steps;

a. Find length-1 sequential patterns. The given sequence "s" is scanned to get item (prefix) that occurred frequently in "s". For the number of times that item occurs is equal to length-1 of that item. Length-1 is given by notation <pattern>: <count>.

b. Divide search space. Based on the prefix that derived from first step, the whole sequential pattern set is partitioned in this phase.

c. Find subsets of sequential patterns. The projected databases are constructed and sequential patterns are mined from these databases. Only local frequent sequences are explored in projected databases so as to expand the sequential patterns.

Figure 4:
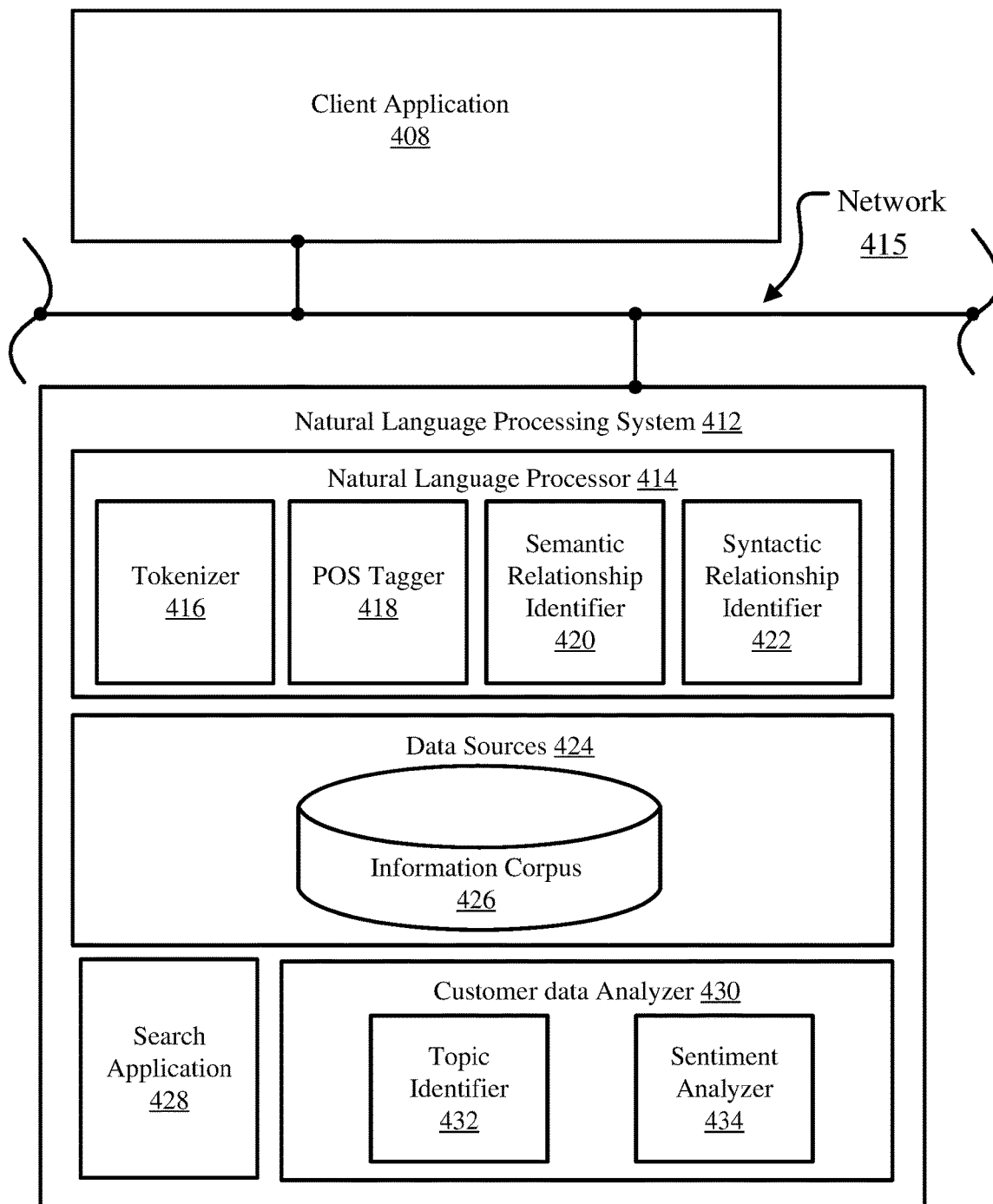
FIG. 4 illustrates a block diagram of an example natural language system configured to analyze customer data, in accordance with embodiments of the present disclosure.

Turning now to FIG. 4, illustrated is a block diagram of an example natural language system 400 configured to analyze customer data (including textual/audio media), in accordance with embodiments of the present disclosure. In some embodiments, a receiving module (such as receiving module 120 of FIG. 1) may receive raw textual/audio data (e.g., customer data) and send them in the form of unstructured textual documents/transcripts (e.g., "electronic documents") to be analyzed by the natural language system 400 which may be a standalone device, or part of a larger computer system. Such a natural language system 400 may include a client application 408, which may itself involve one or more entities operable to generate or modify information in the unstructured textual document(s) (e.g., analog or electronic textual customer data) that is then dispatched to a natural language processing system 412 via a network 415.

Consistent with various embodiments, the natural language processing system 412 may respond to electronic document submissions sent by a client application 408. Specifically, the natural language processing system 412 may analyze a received an unstructured textual document (e.g., customer data) to identify one or more terms associated with the content topic. In some embodiments, the natural language processing system 412 may include a natural language processor 414, data sources 424, a search application 428, and a customer data analyzer 430. The natural language processor 414 may be a computer module that analyzes the received unstructured textual conversation transcript(s) and other electronic documents. The natural language processor 414 may perform various methods and techniques for analyzing electronic documents (e.g., syntactic analysis, semantic analysis, etc.). The natural language processor 414 may be configured to recognize and analyze any number of natural languages. In some embodiments, the natural language processor 414 may parse passages of the documents. Further, the natural language processor 414 may include various modules to perform analyses of electronic documents. These modules may include, but are not limited to, a tokenizer 416, a part-of-speech (POS) tagger 418, a semantic relationship identifier 420, and a syntactic relationship identifier 422.

In some embodiments, the tokenizer 416 may be a computer module that performs lexical analysis. The tokenizer 416 may convert a sequence of characters into a sequence of tokens. A token may be a string of characters included in an electronic document and categorized as a meaningful symbol. Further, in some embodiments, the tokenizer 416 may identify word boundaries in an electronic document and break any text passages within the document into their component text elements, such as words, multiword tokens, numbers, and punctuation marks. In some embodiments, the tokenizer 416 may receive a string of characters, identify the lexemes in the string, and categorize them into tokens.

Consistent with various embodiments, the POS tagger 418 may be a computer module that marks up a word in passages to correspond to a particular part of speech. The POS tagger 418 may read a passage or other text in natural language and assign a part of speech to each word or other token. The POS tagger 418 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one formula may shed light on the meaning of text elements in another formula). In embodiments, the output of the natural language processing system 412 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 418 may assign include, but are not limited to, comparative or superlative adverbs, wh-adverbs, conjunctions, determiners, negative particles, possessive markers, prepositions, wh-pronouns, and the like. In some embodiments, the POS tagger 418 may tag or otherwise annotate tokens of a passage with part of speech categories. In some embodiments, the POS tagger 418 may tag tokens or words of a passage to be parsed by the natural language processing system 412.

In some embodiments, the semantic relationship identifier 420 may be a computer module that may be configured to identify semantic relationships of recognized text elements (e.g., words, phrases) in documents. In some embodiments, the semantic relationship identifier 420 may determine functional dependencies between entities and other semantic relationships.

Consistent with various embodiments, the syntactic relationship identifier 422 may be a computer module that may be configured to identify syntactic relationships in a passage composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

In some embodiments, the natural language processor 414 may be a computer module that may parse a document and generate corresponding data structures for one or more portions of the document. For example, in response to receiving an unstructured textual report at the natural language processing system 412, the natural language processor 414 may output parsed text elements from the report as data structures. In some embodiments, a parsed text element may be represented in the form of a parse tree or other graph structure. To generate the parsed text element, the natural language processor 414 may trigger computer modules 416-422.

In some embodiments, the output of natural language processor 414 may be used by search application 428 to perform a search of a set of (e.g., one or more) corpora to retrieve information regarding customer data and/or media. As used herein, a corpus may refer to one or more data sources. In some embodiments, the data sources 424 may include data warehouses, information corpora, data models, and document repositories. In some embodiments, the data sources 424 may include an information corpus 426. The information corpus 426 may enable data storage and retrieval. In some embodiments, the information corpus 426 may be a storage mechanism that houses a standardized, consistent, clean, and integrated list of conversation topics and/or emotional sentiments. The information corpus 426 may also store, for each topic/sentiment, a list of associated outcomes, by visitor. For example, the information corpus 426 may include a ranking of conversational topics for each encountered visitor, and/or a visitor profile for each encountered visitor. The data may be sourced from various operational systems. Data stored in the information corpus 426 may be structured in a way to specifically address reporting and analytic requirements. In some embodiments, the information corpus 426 may be a data repository, a relational database, triplestore, or text index.

In some embodiments, the customer data analyzer 430 may be a computer module that identifies data point tags or text associated with tags. In some embodiments, the customer data analyzer 430 may include a topic identifier 432 and a sentiment analyzer 434. When an unstructured textual document is received by the natural language processing system 412, the customer data analyzer 430 may be configured to analyze the document using natural language processing to identify one or more content topics. The customer data analyzer 430 may first parse the conversation using the natural language processor 414 and related subcomponents 416-422. After parsing the conversation, the topic identifier 432 may identify one or more topics present in the customer data. This may be done, for example, by searching a dictionary (e.g., information corpus 426) using the search application 428.

The sentiment analyzer 434 may determine the content sentiment for the customer data, according to the content topic identified by topic identifier 432. This may be done by using the search application 428 to traverse the various data sources (e.g., the information corpus 426) for information regarding the terms and phrases used within the customer data. The sentiment analyzer 434 may search, using natural language processing, documents from the various data sources for terms related to those detected in the customer data.

Figure 5:
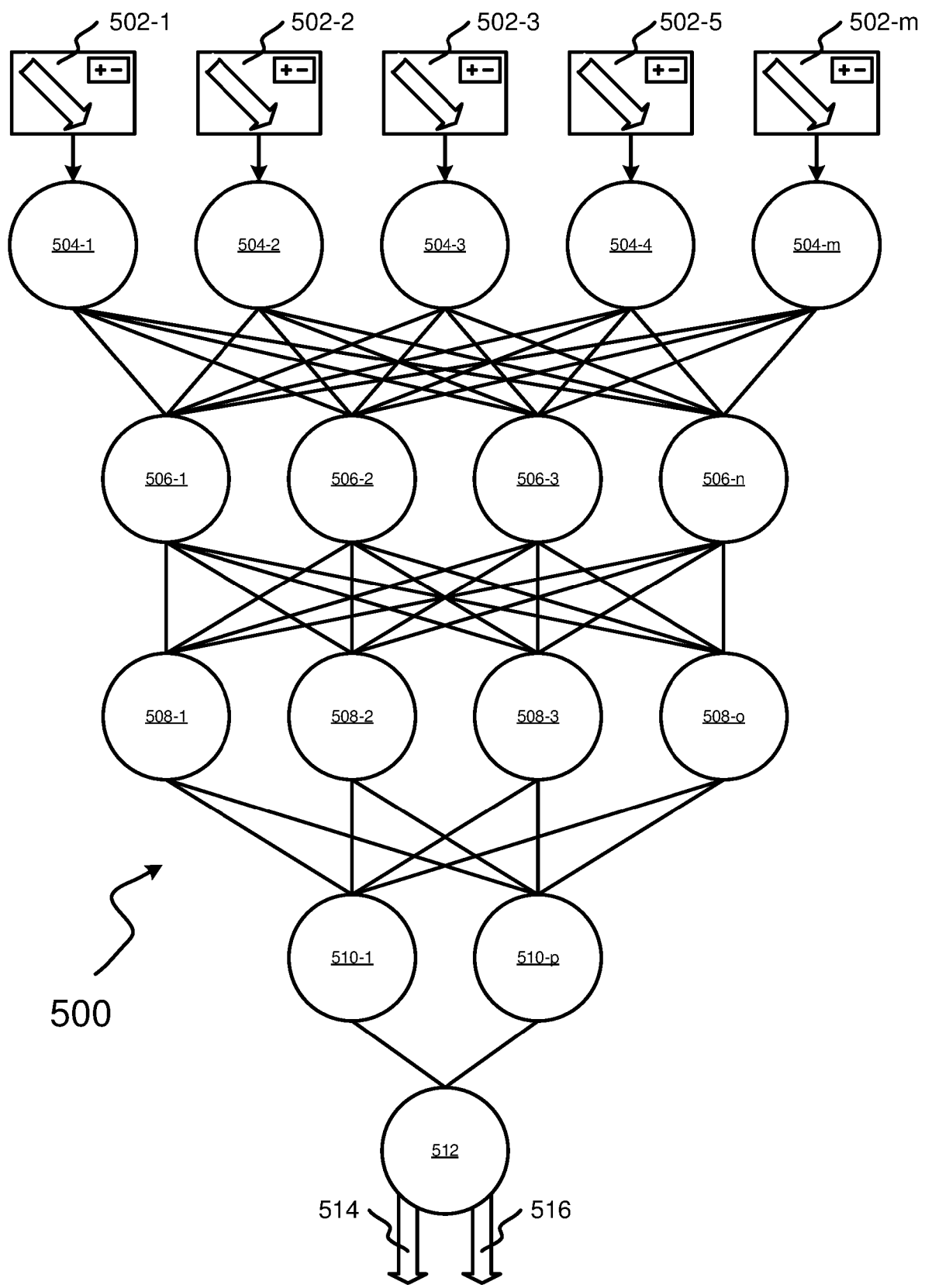
FIG. 5 illustrates an example neural network that may be specialized to process a set of inputs to arrive at a sentiment score, in accordance with embodiments of the present disclosure.

FIG. 5 depicts an example neural network 500 that may be specialized to process a set of inputs to arrive at a cognitively tag and/or a cognitively generated friction point, in accordance with embodiments of the present disclosure. Inputs may include, for example, data retrieved/received from a customer data processing system, such as data annotation system 100 of FIG. 1. In embodiments, neural network 500 may be a classifier-type neural network. Neural network 500 may be part of a larger neural network. For example, neural network 500 may be nested within a single, larger neural network, connected to several other neural networks, or connected to several other neural networks as part of an overall aggregate neural network.

Inputs 502-1 through 502-$m$ represent the inputs to neural network 500. In this embodiment, 502-1 through 502-$m$ do not represent different inputs. Rather, 502-1 through 502-$m$ represent the same input that is sent to each first-layer neuron (neurons 504-1 through 504-$m$) in neural network 500. In some embodiments, the number of inputs 502-1 through 502-$m$ (i.e., the number represented by m) may equal (and thus be determined by) the number of first-layer neurons in the network. In other embodiments, neural network 500 may incorporate 1 or more bias neurons in the first layer, in which case the number of inputs 502-1 through 502-$m$ may equal the number of first-layer neurons in the network minus the number of first-layer bias neurons. In some embodiments, a single input (e.g., input 502-1) may be input into the neural network. In such an embodiment, the first layer of the neural network may comprise a single neuron, which may propagate the input to the second layer of neurons.

Inputs 502-1 through 502-m may comprise one or more artifact component(s) and a relative composition that is associated with a compositional artifact. For example, inputs 502-1 through 502-m may comprise 10 components with their relative compositions that are associated with a seed artifact. In other embodiments, not all components and their relative compositions may be input into neural network 500. For example, in some embodiments, 30 components may be input into neural network 500, but relative compositions for only 20 components may be input into neural network 500.

Neural network 500 may comprise 5 layers of neurons (referred to as layers 504, 506, 508, 510, and 512, respectively corresponding to illustrated nodes 504-1 to 504-m, nodes 506-1 to 506-n, nodes 508-1 to 508-o, nodes 510-1 to 510-p, and node 512). In some embodiments, neural network 500 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 512 is treated as the output layer. Layer 512 outputs a probability that a target event will occur and contains only one neuron (neuron 512). In other embodiments, layer 512 may contain more than 1 neuron. In this illustration no bias neurons are shown in neural network 500. However, in some embodiments each layer in neural network 500 may contain one or more bias neurons.

Layers 504-512 may each comprise an activation function. The activation function utilized may be, for example, a rectified linear unit (ReLU) function, a SoftPlus function, a Soft step function, or others. Each layer may use the same activation function but may also transform the input or output of the layer independently of or dependent upon the ReLU function. For example, layer 504 may be a "dropout" layer, which may process the input of the previous layer (here, the inputs) with some neurons removed from processing. This may help to average the data and can prevent overspecialization of a neural network to one set of data or several sets of similar data. Dropout layers may also help to prepare the data for "dense" layers. Layer 506, for example, may be a dense layer. In this example, the dense layer may process and reduce the dimensions of the feature vector (e.g., the vector portion of inputs 502-1 through 502-m) to eliminate data that is not contributing to the prediction. As a further example, layer 508 may be a "batch normalization" layer. Batch normalization may be used to normalize the outputs of the batch-normalization layer to accelerate learning in the neural network. Layer 510 may be any of a dropout, hidden, or batch-normalization layer. Note that these layers are examples. In other embodiments, any of layers 504 through 510 may be any of dropout, hidden, or batch-normalization layers. This is also true in embodiments with more layers than are illustrated here, or fewer layers.

Layer 512 is the output layer. In this embodiment, neuron 512 produces outputs 514 and 516. Outputs 514 and 516 represent complementary probabilities that a target event will or will not occur. For example, output 514 may represent the probability that a target event will occur, and output 516 may represent the probability that a target event will not occur. In some embodiments, outputs 514 and 516 may each be between 0.0 and 1.0, and may add up to 1.0. In such embodiments, a probability of 1.0 may represent a projected absolute certainty (e.g., if output 514 are 1.0, the projected chance that the target event may occur may be 100%, whereas if output 516 are 1.0, the projected chance that the target event may not occur may be 100%).

In embodiments, FIG. 5 illustrates an example probability-generator neural network with one pattern-recognizer pathway (e.g., a pathway of neurons that processes one set of inputs and analyzes those inputs based on recognized patterns, and produces one set of outputs. However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 500 may be trained/adjusted (e.g., biases and weights among nodes may be calibrated) by inputting feedback and/or archived customer data/archived customer outcomes, as described herein to correct/force the neural network to arrive at an expected output. In embodiments, the impact of the feedback on the weights and biases may lessen over time, in order to correct for emotional fluctuations of the user(s). In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
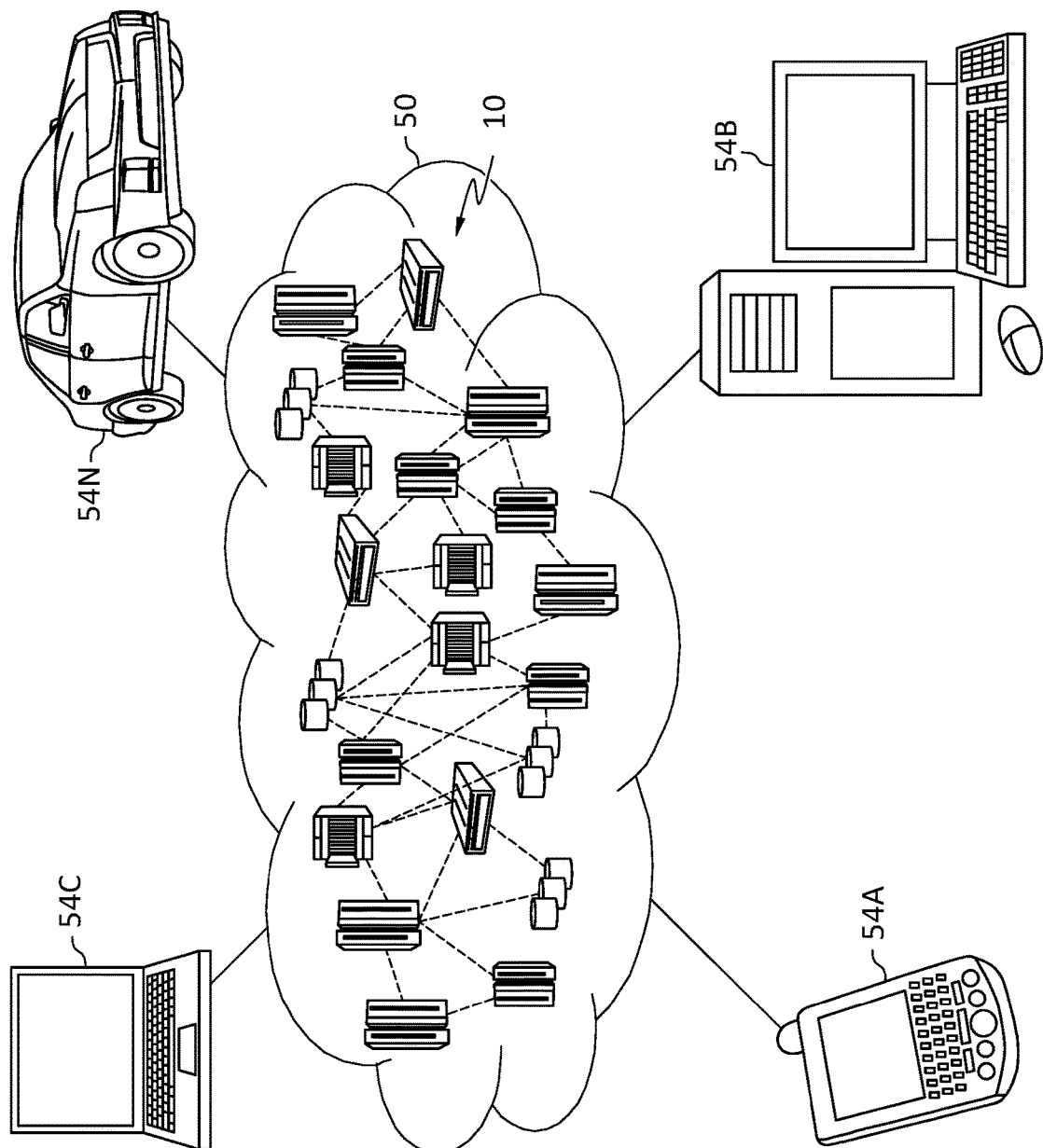
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
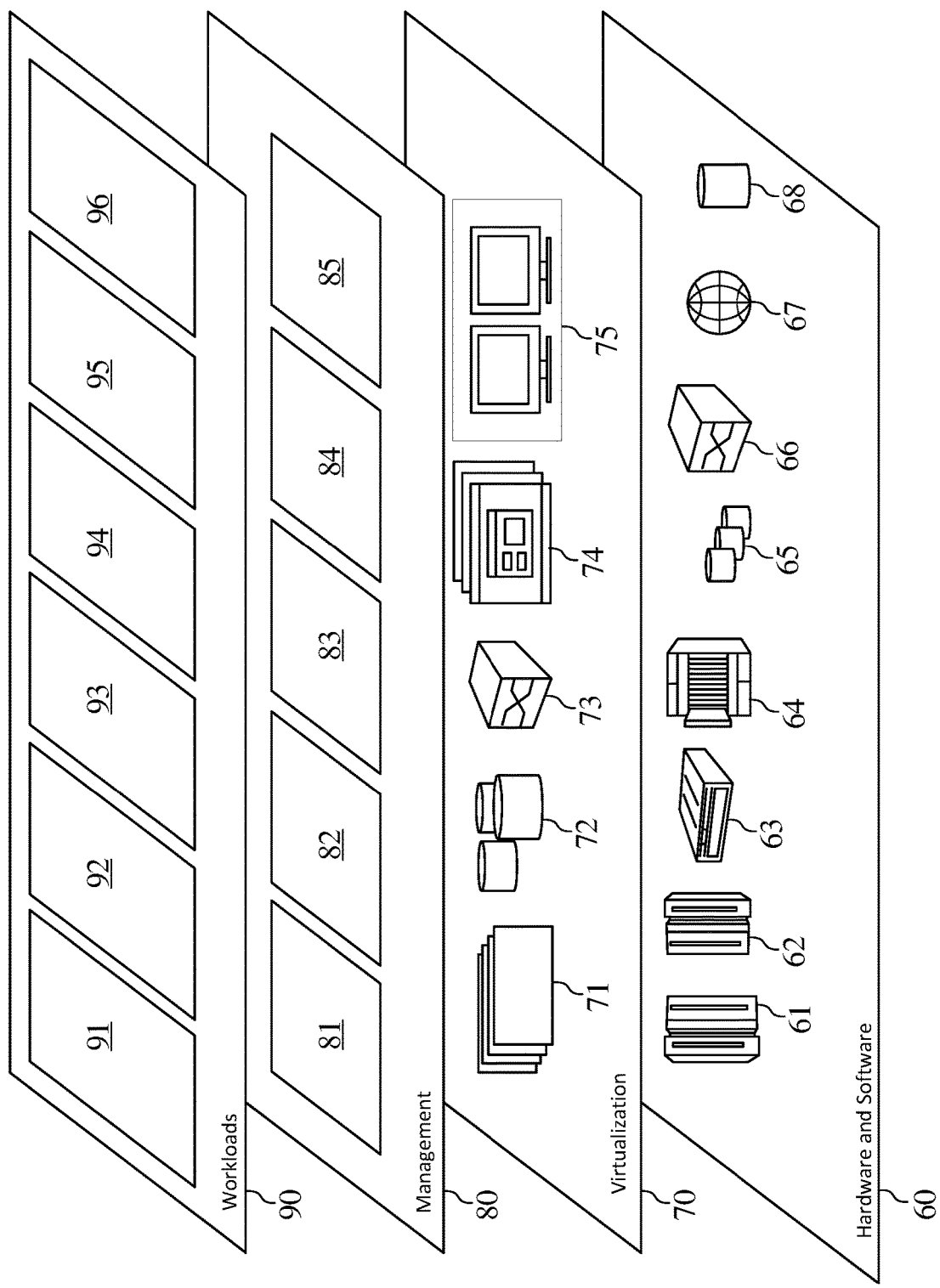
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media selection based on content topic and sentiment 96.

Figure 8:
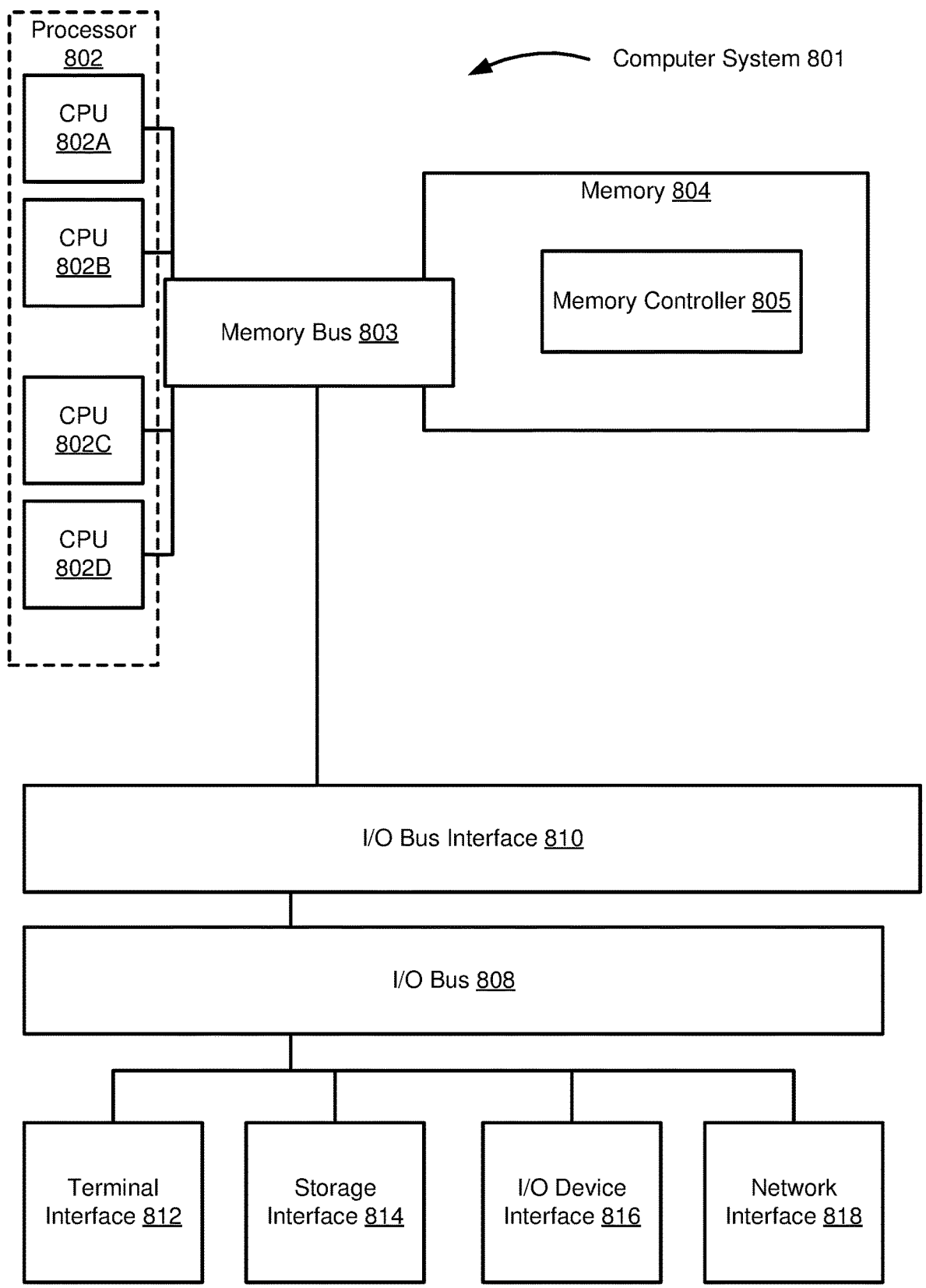
FIG. 8 illustrates a high-level block diagram of an example computer system that may be used in implementing embodiments of the present disclosure.

Referring now to FIG. 8, shown is a high-level block diagram of an example computer system 801 that may be configured to perform various aspects of the present disclosure, including, for example, methods 200 and 300, respectively. The example computer system 801 may be used in implementing one or more of the methods or modules, and any related functions or operations, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may comprise one or more levels of on-board cache.

In some embodiments, the memory subsystem 804 may comprise a random-access semiconductor memory, storage device, or storage medium (either volatile or non-volatile) for storing data and programs. In some embodiments, the memory subsystem 804 may represent the entire virtual memory of the computer system 801, and may also include the virtual memory of other computer systems coupled to the computer system 801 or connected via a network. The memory subsystem 804 may be conceptually a single monolithic entity, but, in some embodiments, the memory subsystem 804 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 802. This may include a memory controller 805.

Although the memory bus 803 is shown in FIG. 8 as a single bus structure providing a direct communication path among the CPUs 802, the memory subsystem 804, and the I/O bus interface 810, the memory bus 803 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a set of input sequence data and predicted class labels for the set of input sequence data;
selecting input sequences, from the set of input sequence data, that have class labels matching a ground truth class label;
reducing the selected sequences to anchor points;
training, by a processor based on the set of input sequence data and the predicted class labels, an attention-based sequence prediction model with a neural network to predict the anchor points in the data responsible for the predicted class labels, wherein at least some of the anchor points are not consecutive subsequences in the sequence data, and wherein the anchor points are critical data points that lead to disparate outcomes;
grouping the reduced selected sequences into anchor sequences using discriminatory subsequence mining;
training, based on the disparate outcomes of the input sequence data, an attention-based model with the neural network to predict friction points by comparing one or more most frequent subsequences to the anchor sequences;
applying the attention-based model to a new set of data to identify anchor points in the new set of data; and
updating, based on the identified anchor points and the new set of data, the attention-based model.

2. The method of claim 1, wherein the reducing further comprises mapping the anchor points to the selected sequences.

3. The method of claim 1, further comprising:
creating a training set comprising the predicted class labels, the set of input sequences of data, the selected sequences, the anchor points, and critical data set signatures; and
training the neural network using the training set.

4. The method of claim 1, wherein the received class labels are predicted using a sequence prediction model.

5. The method of claim 1, wherein the ground truth class label is assured data provided by observation.

6. The method of claim 1, wherein the anchor points are critical data points that lead to the disparate outcomes.

7. The method of claim 1, wherein the grouping further comprises, mining the selected sequences using prefix-projected sequential pattern mining.

8. A computer program product, the computer program product comprising a computer readable storage medium having program instructions embodied therewith, the program instructions executable by a computer to cause the computer to:
   receive a set of input sequence data and predicted class labels for the set of input sequence data;
   select input sequences, from the set of input sequence data, that have class labels matching a ground truth class label;
   reduce the selected sequences to anchor points;
   train, by a processor based on the set of input sequence data and the predicted class labels, an attention-based sequence prediction model with a neural network to predict the anchor points in the data responsible for the predicted class labels, wherein at least some of the anchor points are not consecutive subsequences in the sequence data, and wherein the anchor points are critical data points that lead to disparate outcomes;
   group the reduced selected sequences into anchor sequences using discriminatory subsequence mining;
   train, based on the disparate outcomes of the input sequence data, an attention-based model with the neural network to predict friction points by comparing one or more most frequent subsequences to the anchor sequences;
   apply the attention-based model to a new set of data to identify anchor points in the new set of data; and
   update, based on the identified anchor points and the new set of data, the attention-based model.

9. The computer program product of claim 8, wherein the reducing further comprises mapping the anchor points to the selected sequences.

10. The computer program product of claim 8, further comprising:
    create a training set comprising the predicted class labels, the set of input sequences of data, the selected sequences, the anchor points, and the critical data set signatures; and
    train the neural network using the training set.

11. The computer program product of claim 8, wherein the received class labels are predicted using a sequence prediction model.

12. The computer program product of claim 8, wherein the ground truth class label is assured data provided by observation.

13. The computer program product of claim 8, wherein the anchor points are critical data points that lead to disparate outcomes.

14. The computer program product of claim 8, wherein the grouping further comprises,
    mining the selected sequences using prefix-projected sequential pattern mining.

15. A system comprising:
    a processor; and
    a memory in communication with the processor, the memory containing program instructions that, when executed by the processor, are configured to cause the processor to perform a method, the method comprising:
      receiving a set of input sequence data and predicted class labels for the set of input sequence data;
      selecting input sequences, from the set of input sequence data, that have class labels matching a ground truth class label;
      reducing the selected sequences to anchor points;
      training, by the processor based on the set of input sequence data and the predicted class labels, an attention-based sequence prediction model with a neural network to predict the anchor points in the data responsible for the predicted class labels, wherein at least some of the anchor points are not consecutive subsequences in the sequence data, and wherein the anchor points are critical data points that lead to disparate outcomes;
      grouping the reduced selected sequences into anchor sequences using discriminatory subsequence mining;
      training, based on the disparate outcomes of the input sequence data, an attention-based model with the neural network to predict friction points by comparing one or more most frequent subsequences to the anchor sequences;
      applying the attention-based model to a new set of data to identify anchor points in the new set of data; and
      updating, based on the identified anchor points and the new set of data, the attention-based model.

16. The system of claim 15, wherein the reducing further comprises mapping the anchor points to the selected sequences.

17. The system of claim 15, further comprising:
    creating a training set comprising the predicted class labels, the set of input sequences of data, the selected sequences, the anchor points, and the critical data set signatures; and
    training the neural network using the training set.

18. The system of claim 15, wherein the received class labels are predicted using a sequence prediction model.

19. The system of claim 15, wherein the ground truth class label is assured data provided by observation.

20. The system of claim 15, wherein the anchor points are critical data points that lead to disparate outcomes.

* * * * *